(12) United States Patent
Belcher et al.

(10) Patent No.: US 8,475,018 B2
(45) Date of Patent: Jul. 2, 2013

(54) LIGHT GUIDE FOR AUTOMOTIVE USE

(75) Inventors: Simon Belcher, South Plympton (AU);
Nicholas Schmidt, Macomb, MI (US)

(73) Assignee: SMR Patents S.a.r.l., Luxembourg (LU)

( * ) Notice: Subject to any disclaimer, the term of this patent is extended or adjusted under 35 U.S.C. 154(b) by 160 days.

(21) Appl. No.: 13/089,954

(22) Filed: Apr. 19, 2011

(65) Prior Publication Data

US 2011/0255297 A1    Oct. 20, 2011

(30) Foreign Application Priority Data

Apr. 19, 2010  (EP) .................................. 10160320

(51) Int. Cl.
*B60Q 1/26* (2006.01)
*B60R 1/12* (2006.01)

(52) U.S. Cl.
USPC ............................ 362/494; 362/511; 362/545

(58) Field of Classification Search
USPC .......................... 362/494, 511, 545, 555, 612
See application file for complete search history.

(56) References Cited

U.S. PATENT DOCUMENTS

| 7,357,549 | B2 | 4/2008 | Gunther |
| 2004/0257790 | A1 | 12/2004 | Tanaka et al. |
| 2008/0089080 | A1* | 4/2008 | Kawaji et al. ................. 362/494 |

FOREIGN PATENT DOCUMENTS

| EP | 1304260 | 4/2003 |
| EP | 1391348 | 8/2003 |
| EP | 1726480 | 3/2005 |
| EP | 1852306 | 4/2007 |
| EP | 1847767 | 10/2007 |
| WO | 2009110476 | 9/2009 |

OTHER PUBLICATIONS

European Search Report for application No. EP 10 16 0320 dated Jul. 8, 2010.

* cited by examiner

*Primary Examiner* — Jason Moon Han
(74) *Attorney, Agent, or Firm* — Reising Ethington PC

(57) ABSTRACT

A rear view mirror with a turn signal indicator is proposed wherein the turn signal indicator has a light guide design and a recess for the light source. The position of the recess is optimized to fulfil legal regulations and to achieve the design requests.

7 Claims, 4 Drawing Sheets

LIGHT GUIDE FOR AUTOMOTIVE USE

The invention is based on a priority patent application EP 10160320.7 which is hereby incorporated by reference.

BACKGROUND ART

1. Field of the Invention

The invention is related to a light guide device that is specially adapted to fulfill the legal regulations of visibility and can be produced in a cost efficient way. More particularly, the invention relates to a light guide device that has openings that allow light to be coupled in at a well defined position.

2. Description of the Related Art

Vehicle lamps, such as side flashing lamps or side marking or riding lamps, frequently use bar-shaped light guides into which the light of a light source, such as in particular an LED, is coupled at the end. Light guides have in particular the advantage that a desired light distribution can be implemented using relatively simple means and very inexpensively.

In U.S. Pat. No. 7,357,549, the structure and function of a typical vehicle lamp with a bar-shaped light guide is describe in detail. FIG. 4 of this patent shows a side flashing lamp 4 which is integrated in an external rear view mirror 1 of a motor vehicle. The side flashing lamp 4 includes bar-shaped light guides 5, which extend substantially horizontally in the installed position on the vehicle. In operation, light is coupled into the light guide 5 at a position dividing the light guide into two parts 5a and 5b, and the light is propagated as far as the oppositely disposed ends and is coupled out there or along the light guide. A part of the light also passes to the exterior (forwardly in the direction of travel) through a light exit opening 3 in the cover cap 2.

This prior art shows a solution with a cut in the light guide and a stepped outer surface of the light guide. By implementing the cut, the material strength is small and the step in the light guide covering the light sourced is as a result quite weak. In addition, the conditions to couple the light into the light guide are not described.

As can be seen therefrom, arranged at the end 10 of the light guides 5, 5', which is the vehicle end, are light sources in the form of light emitting diodes 11 having its light output coupled into the light guides 5, 5' in a longitudinal direction L. The major part of the light is passed by total reflection at lateral interfaces to a coupling-out end 7. In that situation, a part of the light is scattered or deflected and, as mentioned, passes to the exterior through the light exit opening 3. The coupling-out end 7 has a bevelled coupling-out surface 8 whose inclination is selected in a way that the light which issues is emitted into a solid angular region which is prescribed by regulation; that is to say substantially transversely with respect to the direction of travel and somewhat inclined rearwardly, as is indicated by arrows F. In that respect, the light emission region is determined by the direction of the light guide at the coupling-out end 7 and the inclination of the bevelled surface 8. The prior art solution does not describe how to couple light into the light guide structure.

US Patent Publication 2004/0257790 discloses a vehicle lamp mounted in a rear view mirror. A bulky light guide member 12 is attached to a mirror and includes a LED that is inserted in a hole in the bulky light guide. The LED is mounted on a printed circuit board. The prior art does not solve the problem of illuminating two parts of a light guide through a recess in a turn signal module.

Document EP1304260 discloses an embodiment in FIG. 72 with an elongated shaped light guide having a recess for two LEDs. The recess of FIG. 72 is not designed as a cut or a structure with well defined surfaces, flat, convex or concave. The LEDs are not inserted to illuminate the two light guide parts similar to separate portions. In this prior art, the two portions of the light guide are not only illuminated by the light sources in the recess, but by an additional light source at one end of the light guide. Therefore, there is no need to couple light into the two portions of the light guide similar to a structure with separated light guides and to optimize recess dimensions.

SUMMARY OF THE INVENTION

An object of the present invention is to provide a vehicle lamp such as a side flashing lamp having a light guide, which has few components and which is inexpensive to produce.

A further object of the invention is to provide a vehicle lamp which has optimized conditions to couple the light of the light source into the light guide having a flat surface.

The foregoing and other objects are attained in accordance with the invention by a vehicle lamp, for example for installation in a cover cap of an external rear view mirror, comprising at least one elongate light guide and a light source whose light is coupled into the light guide in a longitudinal direction. The light guide is part of a cover plate unit which is formed in one piece.

The light guide-cover plate unit is preferably an injection molded part. Such a member can be particularly easily and inexpensively produced. Preferably LEDs are used as the light sources.

A preferred embodiment of the light guide-cover plate unit includes at least one light guide which has a plurality of light guide portions arranged in adjoining relationship in the longitudinal direction and at least one light source, the light of which is coupled into the light guide portions at a defined portion of the light guide in opposite directions. That has the advantage in particular that the fact that the light is coupled into the assembly in an optimized position makes it possible to produce a vehicle lamp which is inexpensive and of a simple structure.

The optimization rule is not restricted to a solution with integrated light guide in a lens cover plate but could be also used in a light guide installed in a turn signal indicator behind a separate lens.

Further objects, features and advantages of the invention will be apparent from the description hereinafter of a preferred embodiment.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
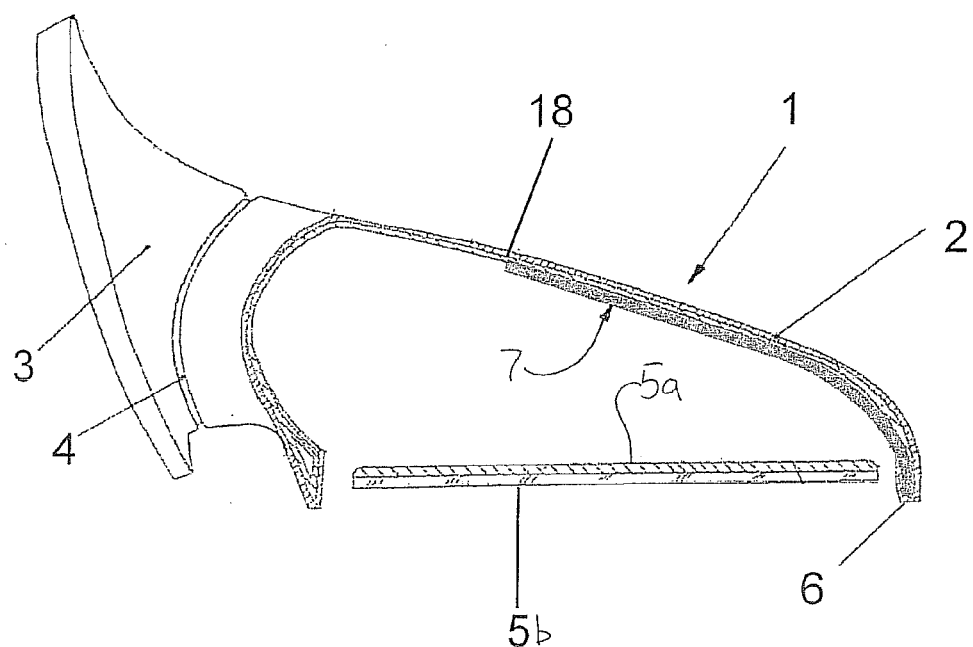
FIG. 1 shows a schematic rear view mirror.

FIG. 1 shows schematically a rear view mirror assembly 1 with a mirror base 3 that is attached at a vehicle. A mirror housing 2 is pivotably connected to the mirror base 3. The mirror housing 2 consists of one of three options: at least one molded cover piece; or of a upper and lower cover; or of a frame or bezel solution with an attached covering scalp device. The mirror housing 2 includes at least one opening for a turn signal indicator 7 wherein the outer shape of the turn signal indicator follows the outer contour of the cover of the mirror housing 2. The extension of the turn signal indicator 7 can be along the whole mirror housing 2 or limited to a portion of the length of the mirror housing 2. A rear end 6 of turn signal indicator 7 ends at a position from which the emitted light falls in direction rearwardly. An inner end 18 is defined by the design of the turn signal indicator 7.

The rear view mirror assembly 1 may further include lighting elements as further indicators or security lights, day running light, or may include other electrical or electronic users as cameras and sensors etc. For these functions, additional opening can be foreseen in the rear view mirror assembly 1. The mirror housing 2 hosts a mirror support 5a and a reflective element 5b and/or a camera element that may augment or replace the reflective element 5b.

Figure 2:
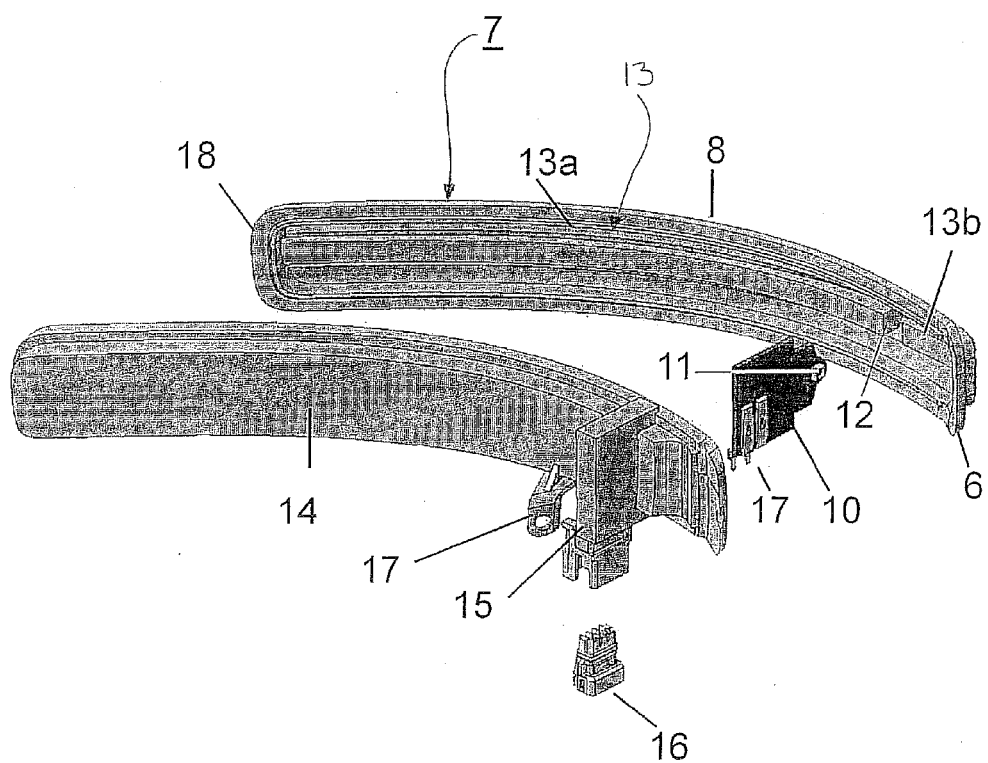
FIG. 2 shows an inventive turn signal indicator module.

FIG. 2 shows an example of a turn signal indicator module 7 that can be installed in the rear view mirror assembly 1.

The turn signal indicator 7 has two main parts to build a module, a lens 8 covering the turn signal indicator 7 and a support housing 14. Integrated in the lens 8 is a light guide 13, which extends along a longitudinal axis of the turn signal indicator 7. The light guide 13 is a bar shaped elongated device, which can have different cross section shapes according the requested light travelling and light emitting functions. The light guide 13 has two portions 13a, 13b that are separated from each others by a recess 12 in the light guide 13. The opening of the recess 12 is sized to host at least one light source, an LED 11, that is inserted into the recess 12. The outer contour is smoothly adapted to the outer contour of the rear view mirror assembly 1 without stepped structures in the region of the recess 12. The LED 11 is mounted on a printed circuit board 10 having driver circuitry and connection leads 17.

The turn signal support housing 14 forms a cover 15 to protect the printed circuit board 10 and to guide the printed circuit board 10 during installation. The printed circuit board 10 is disposed perpendicular to the portion of the light guide 13 disposed immediately adjacent the recess 12. A connector 16 connects the printed circuit board 10 to electrical wiring and systems aboard the vehicle.

The turn signal indictor 7 is mounted by simply fixing the printed circuit board 10 in the cover 15 of the turn signal support housing 14. The support housing 14 is then connected to the lens 8/light guide 13 combination and the LED 11 is positioned in the light guide recess 12.

Figure 3:
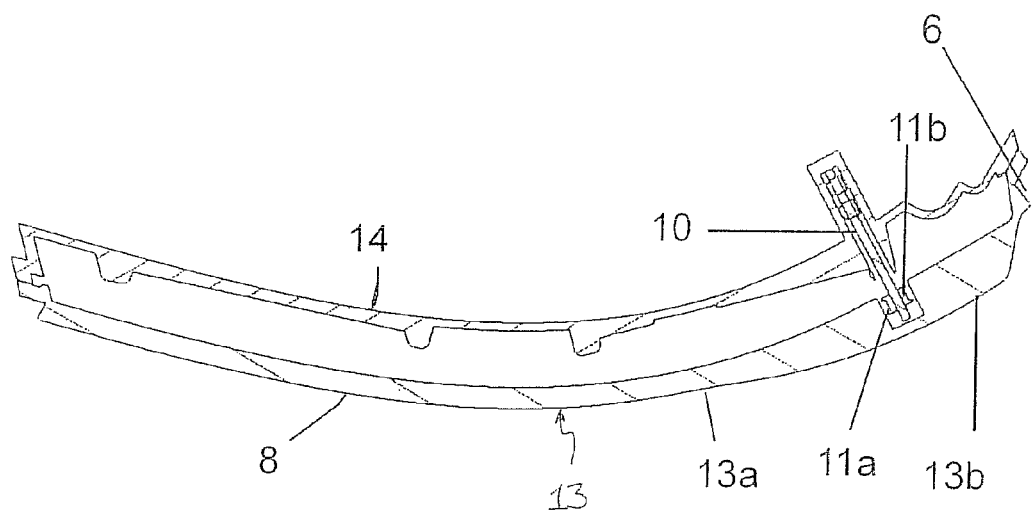
FIG. 3 shows a cross section of an inventive turn signal indicator.

FIG. 3 shows a cross section through the turn signal indicator 7 with the light guide 13 and lens 8 with the two light guide portions 13a and 13b. In this embodiment, two LEDs 11a, 11b are incorporated into the design with one of the two LEDs 11a, 11b mounted on either side of the printed circuit board 10. The LED 11b emits its light towards the decoupling end 6 of the light guide 13. The portion 13b of the light guide is short in comparison with the portion 13a. This helps to achieve a high power of light at the decoupling end 6 of the light guide 13 to be consistent with the legal regulation requirements. For illumination of 13a, the second LED 11a emits its light into the longer portion 13a. For this portion 13a is not part of regulation, the light decoupling rates and the impression of this part of the turn signal indicator assembly 1 can be modified according customers' needs. The use of two independent LEDs allows the optimization of power consumption and light power emission at the positions that are needed.

Figure 4:
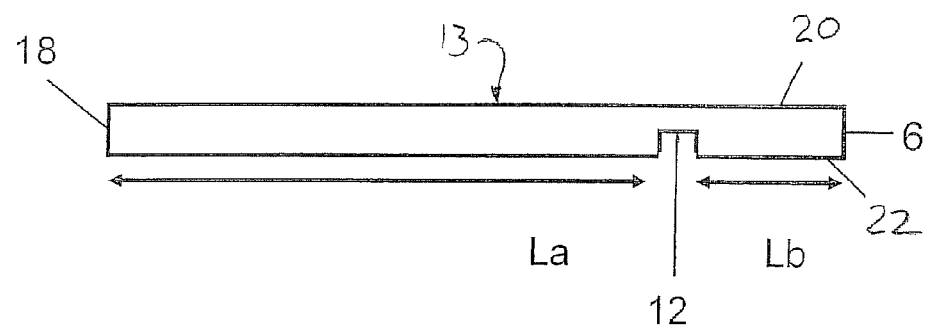
FIG. 4 shows the relation of light guide portions.

In FIG. 4 the lengths of the two light guide portions are defined. The length La follows the rule to be at least two times longer than Lb.

These lengths are optimal to achieve the required emission profile. For example, a short length La would not achieve the appearance of a smooth light guide. Or, with a longer length Lb, the power loss of light in the light guide increases and reduces the available light power to be decoupled at the end facet 6 of the turns signal indicator 7.

What is not shown in this schematic view are the decoupling structures of the light guide 13. For decoupling light along the travelling direction, decoupling structures are necessary, and may include prismatic structures, facets, or nuts. These structures could be applied to an outside 20 or an inside 22 surface of the light guide 13.

To achieve a lighted appearance of the length La in the light guide 13, a high density of decoupling structures is applied, for it is not necessary that light is emitted at an inner end 18 of the light guide 13. The power of LED 11a can be fully used to illuminate the light guide 13 as such. On the length Lb, more light must emitted at the end 6 and only a part should be decoupled along the length Lb.

Figure 5:
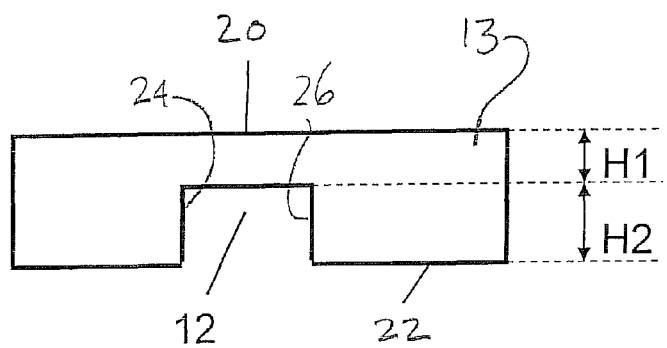
FIGS. 5 through 7 show embodiments of the light guide recess.

FIG. 5 shows the dimension of the recess 12 that covers the LEDs 11a, 11b. The thickness of the material used for the light guide 13 is defined by the aggregate of H1 and H2. The recess 12 has a height of H2 and the difference between the total thickness H1+H2 and the depth of the recess H2 is the H1, wherein H1 is smaller that H2. In one embodiment, H1>1 mm. The limitation is the molding technology, so that H1 has a minimum thickness to cover the recess 12 without a stepped structure on the outer surface 20.

The total size of the light guide 13 depends also on the size of the LEDs 11a, 11b used. Only if the LEDs can be inserted into the recess 12 completely can the emitted light be coupled into the two portions 13a, 13b of the light guide 13. In FIG. 5, the side walls or coupling faces 24, 26 of the light guide 13 are rectangular. They are the faces provided to couple light into the two portions 13a, 13b of the light guide 13. FIGS. 6 and 7 show two alternative solutions, wherein the coupling faces 24', 24'', 26', 26'' are designed to show a concave or convex structure with a concave radius r1 and a convex radius r2.

Figures 6A, 6B:
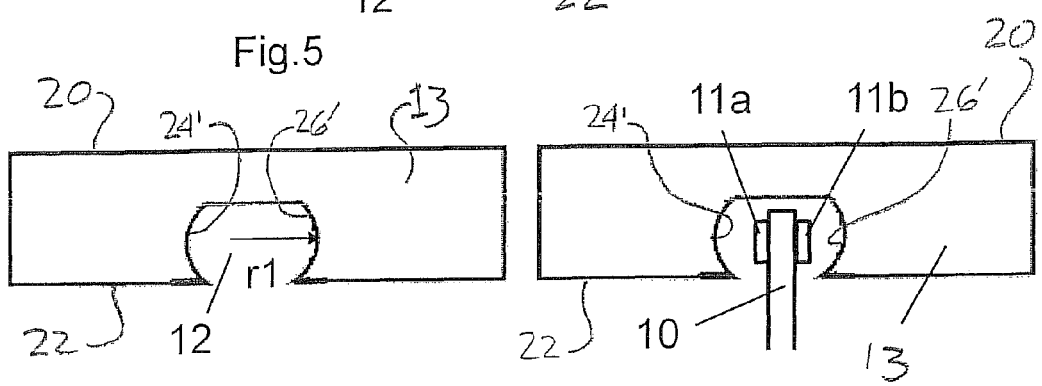
Figure 7:
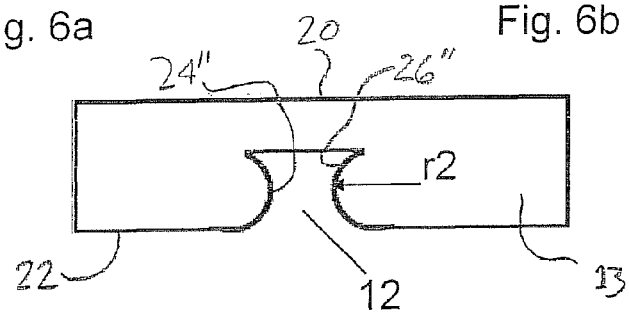

In FIG. 6b it is shown that the LEDs 11a, 11b are positioned in the focus of the concave structure.

The convex lens structure of FIG. 7 has in addition to the function to couple light in the function to guide and fix the LEDs 11a, 11b and the printed circuit board 10 in the recess 12.

Figure 8:
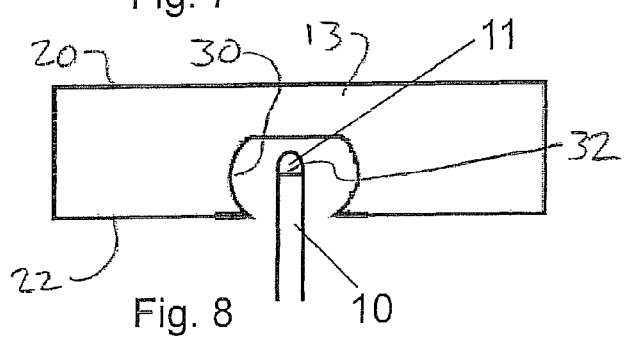
FIG. 8 illustrates an alternative embodiment.

FIG. 8 shows a solution with a circular cross section 30 for recess 12. This solution is optimal for the use of a single LED 11 solution. In this embodiment the single LED 11 is mounted at a top edge 32 to the printed circuit with its pins on both sides of the printed circuit board 10. The LED 11 can than emit light in the circular recess 30 in around a space of 180° and the light is coupled into the light guide portions 13a, 13b.

Alternative embodiments of the inventive solutions are possible. So the installation of separate light guide behind a lens does not influence the content of the invention. Also the installation or integration of several parallel installed light guides is possible.

We claim:

1. A rear view mirror assembly for a motor vehicle, said rear view mirror assembly comprising:

a mirror base fixedly securable to the motor vehicle;

a mirror housing securable to said mirror base, said mirror housing including a reflective element movably secured therein;

a light guide module fixedly secured to said mirror housing, said light guide module including a light guide having an entirely smooth and flat outer surface and a lens covering said light guide with said light guide and said lens formed integrally, said light guide defining a recess dividing said light guide into first and second portions such that a first length of said first portion is greater than two times a second length of said second portion, said recess defines a recess depth (H2) and said light guide defines a light guide thickness (H1+H2) such that said recess depth (H2) is greater than half of said light guide thickness (H1+H2);

and a light source inserted completely into said recess such that light emitted by said light source is received and guided by said first and second portions of said light guide.

2. A rear view mirror assembly as set forth in claim 1 wherein said recess defines flat coupling faces.

3. A rear view mirror assembly as set forth in claim 1 wherein said recess defines concave coupling faces having a radius of curvature equal to the distance said light source is from said coupling faces.

4. A rear view mirror assembly as set forth in claim 1 wherein said recess defines convex coupling faces having a radius of curvature equal to the distance said light source is from said coupling faces.

5. A rear view mirror assembly as set forth in claim 2 including a printed circuit board disposed perpendicular to said light guide, said printed circuit board electrically connected to said light source.

6. A rear view mirror assembly as set forth in claim 5 wherein said printed circuit board includes two light sources disposed on either side thereof 7. A rear view mirror assembly as set forth in claim 5 wherein said printed circuit board defines an edge such that said light source is fixedly secured to said edge.

* * * * *